March 18, 1958  C. RINGWALD  2,827,579
MOTOR
Filed June 16, 1955
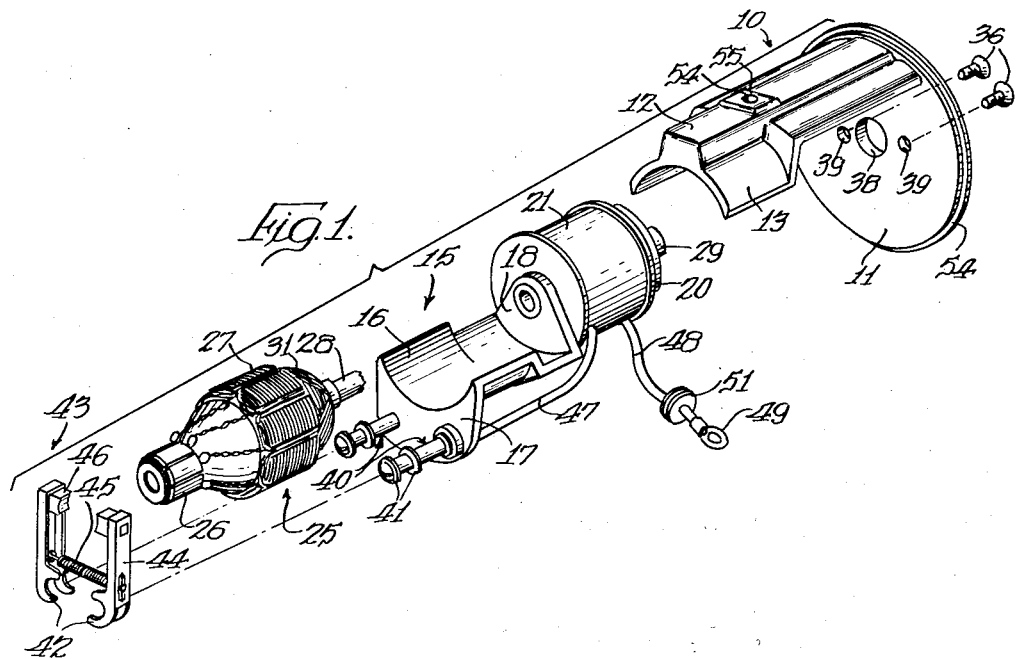
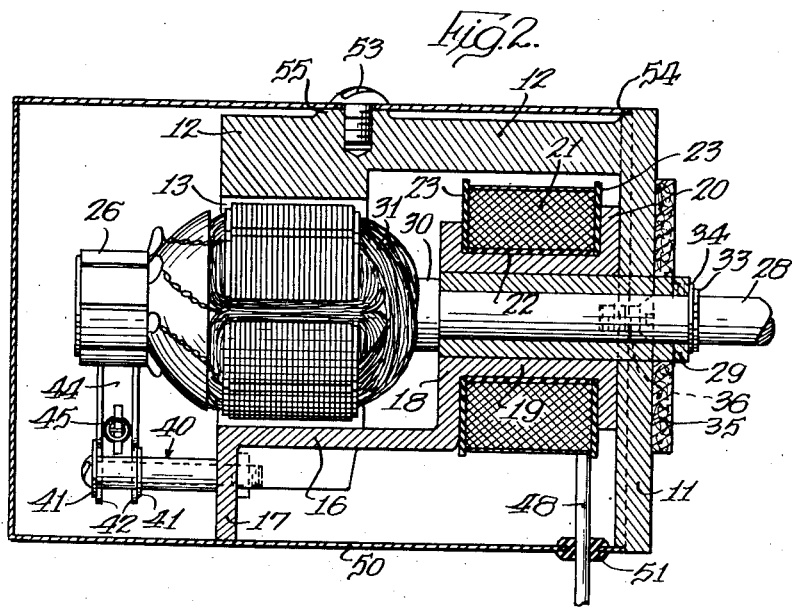
INVENTOR.
Clarence Ringwald
BY
Attys

United States Patent Office 2,827,579
Patented Mar. 18, 1958

2,827,579
MOTOR
Clarence Ringwald, Springfield, Ohio
Application June 16, 1955, Serial No. 515,870
1 Claim. (Cl. 310—40)

This invention relates to electrical motors or generators and more particularly to improvements in motors and generators using direct current.

Industry is constantly striving for improved efficiency of design and construction in all fields and such concern is particularly noticeable in the electrical equipment field wherein simplification of construction and ease of assembly lead to marked economies and increased production. Of special importance in the field of electrical products is the utilization in the automotive field, for example, of small direct current motors for driving such things as turn signal circuit breakers, windshield wipers, seat adjusters, window operators, or for generators as in battery charging, etc. In an effort to conserve time and material in the production of the motors for such convenience devices my efforts have been directed towards the simplification of the motor assembly and the reduction of the number of component parts requisite for a successful electric motor, especially of the direct current class. One of the features which I believe marks my present device as an outstanding advancement in this field is the utilization of a single field winding and a pair of remote field pieces arranged to conduct a magnetic field from the single field winding to and around a remotely disposed armature. Another outstanding feature of my new motor or generator resides in the utilization of a core for supporting the field winding which embodies bearing means for carrying the armature shaft. While my efforts to date have concerned motors of a fractional horsepower size, I am confident that the principles of my present invention are applicable with equal facility to motors and generators of larger size.

Among the objects of my invention is to provide a new and improved electrical motor or generator in which the field coil is disposed remotely of the armature windings.

Another object of my invention is to provide a new and improved means for supporting the armature of an electrical motor or generator.

A further object of this invention is to provide a new and improved construction for an electric motor which leads to advanced economies of production and the conservation of time and labor in the assembly of the motor.

A still further object of this invention is to provide a new and improved motor or generator of a simplified and improved design having features which facilitate compactness and promote an improved and more rugged product.

Without dwelling further on the particulars of my invention at this point, I am confident that those familiar with the art will recognize its above listed and other objects and features from the detailed description which follows and especially in view of the illustration of a preferred embodiment thereof as found in the accompanying drawings.

In the drawings:

Figure 1 is an exploded perspective view showing the relation of the several sub-assemblies and elements which comprise the component parts of my improved motor; and Figure 2 is an enlarged cross-sectional view taken substantially along the longitudinal center line of my improved motor as such appears in its assembled condition.

In Figure 1, I have shown my invention embodied in a motor wherein a casting 10 as illustrated at the extreme right hand end of that figure comprises a circular wall portion 11 having an elongated arm portion 12 extending transversely to the plane of the wall portion 11 and from one edge thereof. An arcuate shoe portion 13 is formed at the outer end of arm portion 12 and substantially transverse to its longitudinal axis. Such casting 10 forms the first of two motor pole pieces which are employed to provide the magnetic field in the motor as illustrated. Casting 10 is preferably made of malleable iron with its size and weight helping to determine the characteristics of the motor or generator as the case may be.

It will be seen that a second casting member 15 having an arcuate shoe portion 16 which opposes and matches the arcuate shoe portion 13 of casting 10 is also provided. Casting 15 has an end wall portion 17 disposed transversely at one end of the shoe portion 16 and a substantially triangular wall portion 18 which extends parallel but opposite to wall portion 17 adjacent the other end of shoe 16. Such wall portion 18 is cast integrally with a hollow core or cylindrical portion 19 (best viewed in Figure 2 of the drawings) which terminates in an annular flange wall 20.

The spacing between the flange wall 20 and the triangular wall portion 18 defines a spool for mounting the field windings 21 which are best established on casting 15 by rotating such casting in a lathe or like machine and winding the field coil directly about the cylindrical portion 19. In this regard note that insulation 22 is established between the windings 21 and the core portion 19 while annular discs 23, 23 serve to insulate the field winding from the wall portions 18 and 20. Casting 15 and especially the arcuate shoe portion 16 thereon forms the second of the two field pieces for the motor; the excitation of the field windings 21 causing the transfer of the eletcromagnetic field through the malleable iron castings 10 and 15 to the shoe portions 13 and 16 which surround an armature assembly 25.

The armature assembly 25 is of conventional design and is provided with a commutator 26 and a seven slot separator assembly comprising a plurality of separator discs or plates indicated generally at numeral 27 and mounted on a shaft 28.

The shaft 28 of the armature assembly is supported in a single elongated sleeve bearing 29 supported centrally within the core portion 19 of the casting 15, as shown in Figure 2. Such sleeve bearing 29 is preferably of the brass oilless variety with the armature shaft having a shoulder portion 30 at one end adjacent the armature windings 31 to abut against the sleeve bearing 29. The sleeve bearing is best press fitted within the core portion 19. It is fully contemplated that the shaft 28 may be supported directly in core portion 19 of the casting 15 by eliminating the bearing 29 in which case lubrication would be accomplished by other means than described. In regard to shaft 28, note that such serves to replace a large part of the flux circuit or metal lost in forming the bore in casting portion 19. Thus replacement is even more pronounced when bearing sleeve 29 is eliminated. Thus the armature shaft forms part of the magnetic circuit.

The armature shaft 28 is of sufficient length to extend beyond the flange wall 11 of casting 10 and through the length of bearing 29 for attachment with means to be driven by the motor. Means for holding the armature against axial displacement relative to the bearing means 29 and the two castings 10 and 15 comprises a snap ring 33 adapted to seat in a suitable annular recess formed in the shaft 28 and disposed outwardly of one or more spacer washers 34 which are employed to adjust the axial play for the armature assembly. Additional spacer washers (not shown) may likewise be employed between the inner end of bearing 29 and the abutment portion 30 of the armature or rotor as required. A felt washer means 35 is also included outwardly of flange wall 11 and about the shaft 28 where it extends past such wall to hold lubricant as desired.

The casing 15 is coupled to casting 10 by two screw members 36, 36 which invade openings 37 formed in the flange wall 11 of casting 10 for threading connection in suitable openings formed in the end wall 20 of casting 15. Thus the assembly of the field and armature assemblies is carried out by axially inserting the armature shaft 28 through a central opening 38 in the flange wall 1 and joining the screw means 36, 36 with the end wall 20 of casting 15.

The end wall 17 of casting 15 is fitted with a pair of spaced and transversely extending mounting posts 40, 40 which are each equipped with axially spaced flange portions 41, 41 for holding fingers 42, 42 of a suitable brush assembly indicated generally by numeral 43. The finger portions 42 are formed at the lower ends of a pair of arm members 44 which are interjoined intermediate their ends by spring means 45. The outer or upper ends of arms 44 bear the commutator brushes 46. The brush assembly shown and thus described is a comerically available item and is coupled in working arrangement with the commutator ring 26 of the armature by fastening the finger portion 42 over the mounting posts 40 and between the spaced flange portions 41 thereon so that the spring means 45 is tensioned. The brush members 46 are thus pressed against the commutator ring 26.

In a series wound motor of the type illustrated in Figure 1, for example, one of the posts 40 will be joined with the field windings 20 as by conductor 47. The field windings 20 also have a conductor 48 equipped with a terminal connector 49 thereon or other suitable means for connection to a suitable source of direct current potential. Other circuit arrangements may be employed, naturally, according to known practice.

It will be appreciated that the mounting posts 40 are carried with the casting 15 and thus comprise a part of a subassembly formed of the casting 15, field windings 21 and the bearing means for the armature shaft. One of the outstanding features of this sub-assembly which greatly promotes the compactness and simplicity of the present motor is brought about by providing the angle bearing means 29 coaxially of the field winding support or core to thus permit coaxial association of elements shown.

When the several items as described are associated as shown in Figure 2, the conductor 48 is passed through a cylindrical shell or housing 50 or through an opening formed in flange wall 11 for connection to a source of potential; such conductor as shown being insulated from housing 50 by means of a grommet washer 51 or the like. Housing 50 is arranged to concentrically surround the assembled castings 10 and 15 with the armature and brush assemblies being disposed as illustrated in Figure 2. The casing or housing therefore encloses the working elements of the motor and is guided into its concentric position as shown by means of an annular shoulder 52 formed on the periphery of the wall 11. A single screw means 53 is employed to keep the housing 50 in its assembled position; such screw means passing through the side walls of the housing and into the casting 10 intermediate the ends of the arm portion 12 thereon as at opening 54 formed in pad 55.

From the foregoing it is believed that those skilled in the art will recognize and understand the improved features of construction and the arrangement of elements which comprise the improved motor of this invention. Primarily it is intended that a motor of this design be made as a series motor, but such may be wound either compound or shunt with the cast members 10 and 15 being made either of cast iron, malleable iron or steel. In determining the size of the castings 10 and 15 the particular type of material employed must be regarded. As a general rule it is advanced that the amount of cast iron employed should approximate twice the amount of malleable iron used, whereas if the castings are made of steel such will comprise about two thirds the amount of malleable iron for motors and generators having the same general characteristics. The amount of material employed in the castings determines, to a large extent, the operating characteristics of the motor so far as the intensity of the field is concerned, this being dependent as well on the size of the field windings, etc., all of which factors are recognized and appreciated by those skilled in the art and will not be dwelled on particularly herein other than to say that the factors of field intensity and related items are controllable by determining the size and material from which the cast field pieces are constructed. This provides a convenient design control.

In a typical series wound motor operable on 4½ to 7 volt direct current, I prefer that the armature comprise a seven slot variety having 30 turns of number 26 wire while the field coil 21 should comprise approximately 135 turns of number 19 wire (depending, of course, on the torque desired) while the cast field pieces should include substantially three quarters of a pound of malleable iron. In a shunt wound motor of the same class a shunt winding of 500 turns of number 30 wire and an armature winding of approximately 55 turns of number 29 wire would be typical. While I have set out these specifications as examples for size and particulars of a motor embodying this invention, such are by no means intended to be restrictive or exclusive, since the number of turns, torque and like characteristics are entirely dependent on the particular results desired; such knowledge being well within the skill of those familiar with the art. Further, while I have herein discussed this invention in its relation to a direct current motor, it is also obvious that such is capable of performing the functions of a generator or a motor-generator with slight and conventional change.

Thus I have set forth the features and details of the improved motor of this invention and it is to be recognized that numerous changes, modifications and substitution of equivalents may be made therein without necessarily departing from its spirit and scope. As a consequence it is not my intention that I be limited to the particular preferred embodiment of the invention as found in the accompanying drawings and described hereinabove except as may appear in the following appended claim.

I claim:

A direct current motor of the class described, comprising a substantially cylindrical field winding, a sleeve-type bearing disposed concentrically within said field winding, a first casting having a support portion at one end disposed concentrically between said bearing and field winding and supporting the same, an armature assembly including a shaft, an armature winding, and a commutator means, the said shaft being rotatably supported in said bearing whereby said armature assembly and field winding are coaxial with the armature and field windings axially remote from one another, a commutator brush assembly mounted at the other end of said first casting for operating engagement with said commutator means, a second casting having a flange portion at one end receptive of one end of said bearing and abuttingly engaging one end face of said support portion, means fastening said flange to said support portion in such a manner that said armature shaft passes concentrically through both said support portion and flange, means locking said shaft against axial displacement at points adjacent opposite ends of said field winding, and shoe portions formed one on each of said castings and defining a pair of opposed magnetic portions comprising arcuately-shaped field members disposed radially outward of said armature winding to provide an electromagnetic field induced by energization of said field windings.

References Cited in the file of this patent

UNITED STATES PATENTS

| | | |
|---|---|---|
| 294,094 | Thomson | Feb. 26, 1884 |
| 519,281 | Baxter | May 1, 1894 |
| 540,351 | De Camp | June 4, 1895 |
| 1,267,210 | Gillaspy | May 21, 1918 |
| 1,594,398 | Wolkoff | Aug. 3, 1926 |
| 1,648,564 | Pattay et al. | Nov. 8, 1927 |
| 1,933,591 | Holtz et al. | Nov. 7, 1933 |
| 2,181,418 | Cohen et al. | Nov. 28, 1939 |
| 2,553,292 | Barrett | May 15, 1951 |